A. HANSCHILD.
NUT AND BOLT LOCK.
APPLICATION FILED FEB. 20, 1917.

1,230,891.

Patented June 26, 1917.

WITNESS

INVENTOR.
Aurel Hanschild

UNITED STATES PATENT OFFICE.

AUREL HANSCHILD, OF PITTSBURGH, PENNSYLVANIA.

NUT AND BOLT LOCK.

1,230,891.  Specification of Letters Patent.  Patented June 26, 1917.

Application filed February 20, 1917. Serial No. 149,725.

*To all whom it may concern:*

Be it known that I, AUREL HANSCHILD, a resident of Pittsburgh, in the county of Allegheny and State of Pennsylvania, have invented a new and useful Improvement in Nut and Bolt Locks, of which the following is a specification.

The invention relates to nut locks. It relates particularly to the type of nut locks which are in the form of washers arranged to be placed beneath a bolt head or a nut to prevent the same from loosening under jars and vibrations.

The general object of the invention is to provide an improved nut lock which will firmly and positively prevent the nut from loosening, at the same time grip the bolt and prevent it from turning and which may be readily grasped by a wrench to permit the nut to be removed when such removal is desired.

Another object is to provide an improved nut and bolt block which is simple and inexpensive and adapted to be readily applied to any bolt or nut without requiring alteration in the construction thereof and one which is positive in its action in preventing the loosening of the bolt or nut under vibration or jarring.

A further object is to provide an improved bolt and nut lock which will not only efficiently lock the nut or bolt against undesired movement but which will also readily permit the nut or bolt to be loosened, when desired.

Other objects and advantages of the invention will appear from the following specification.

Figure 1:
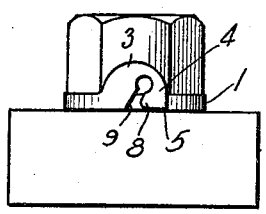
Figure 2:
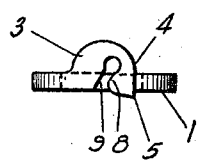
Figure 3:
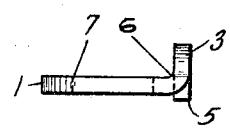
Figure 4:
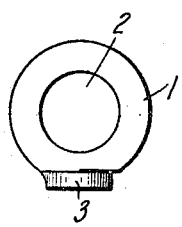
Figure 5:
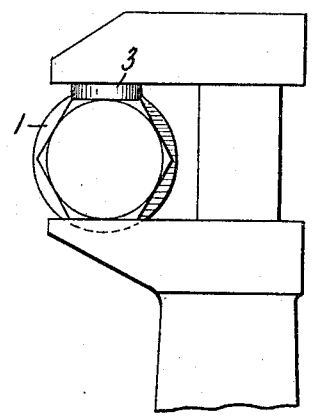

An embodiment of the invention is shown in the accompanying drawings in which the views are as follows:

Figure 1 is a side elevation of the nut lock in operative position; Fig. 2 is a side elevation of the nut lock removed; Fig. 3 is a side elevation at right angles to Fig. 2; Fig. 4 is a plan view of the lock and washer; and Fig. 5 illustrates the manner in which the lock is grasped to remove it.

The nut lock comprises a washer 1 having an opening 2 therein for the reception of a bolt. Struck up from the washer near the outer edge thereof is a resilient tongue having an upwardly extending portion 3 and a downwardly extending free end 4. The free end 4 is provided with a biting edge 5 that normally projects below the bottom surface of the washer. This resilient tongue or projection is shaped so that when the washer is placed in position it contacts one of the flat faces of the nut or bolt head and thus turns with the nut or bolt.

The tongue 3 is preferably bent upwardly on a radius 6, as shown in Fig. 3, the curved surface thus formed being spaced at such a distance from the center of the washer that when the bolt head or nut is forced home, the edge of the nut cams the washer over to cause the edge 7 of the opening therein to grip the threads in the bolt to thereby prevent the bolt from turning.

The tongue or projection is also formed in a novel manner so that it acts to grip tighter as the nut tends to loosen and, when an abnormal force is applied, it is automatically strengthened by being backed up by the solid portion of the washer. The free end of the projection, that is, the end carrying the biting edge 5, normally projects below the lower surface of the washer. When the washer is placed in position, as shown in Fig. 1, with the nut screwed down, the resiliency of the spring tongue causes the edge 5 to bite into the surface on which the washer is resting. Accordingly, if the washer tends to turn in a direction to loosen the nut or bolt, the edge 5 acts as a fulcrum around which the free end 4 of the tongue turns. This causes the edge 5 to bite into the surface at a sharper angle and with more force. The free end 4 may move a limited distance until the heel 8 thereon engages the surface 9 on the main body of the washer, whereupon the projection becomes in effect a solid part.

It will be clear that the resiliency of the spring tongue normally prevents the washer from loosening under jars or vibration and whenever any abnormal force is applied to unloosen the bolt or nut, the spring tongue automatically bites into the surface at a sharper angle and grips more firmly. At the same time the tongue is shaped so that it is automatically biased by the nut or bolt head to grip the bolt.

In order to unloosen the bolt or nut it is grasped by a wrench so that one of the jaws of the wrench engages the spring tongue. By grasping the nut and spring tongue firmly with a wrench, the bending down or gripping action of the tongue is prevented and the nut or bolt may be easily removed.

This single projection on the washer therefore performs all the desirable functions in a device of this character. It is normally biased to grip the surface to prevent the nut or bolt turning under jars or vibrations; it also causes the washer to grasp the bolt to prevent it from turning; and it is arranged so that when an abnormal force is applied to loosen the nut, it bites into the surface harder and is automatically backed up and strengthened. This same projection enables the nut to be readily loosened by the application of a wrench in the usual position on a nut or bolt head. The washer may be readily manufactured by being stamped out of sheet metal and formed to shape in a die.

It is to be understood that the structure shown is for purposes of illustration only and that other structures may be devised within the spirit and scope of the appended claims.

What I claim is:—

1. A nut lock comprising a washer having a projection thereon arranged to contact one of the faces of the nut and to grip the surface engaged by the washer so that the more the nut tends to loosen the tighter the projection grips the surface.

2. A nut lock comprising a washer having a single integral projection arranged to grip the surface beneath the washer to prevent the washer from being turned in one direction and also being arranged to be biased by the nut to grip the bolt to prevent it from turning.

3. A nut lock comprising a washer having a single integral projection arranged to contact one of the faces of the nut to prevent the nut from turning and to enable the projection to be gripped by a wrench, said projection being shaped so as to grip the surface beneath the washer with a biting and wedging action to prevent the nut being loosened and also being arranged to be biased by the nut to grip the bolt to prevent it from turning.

4. A nut lock comprising a washer having a projection thereon formed so as to contact one of the faces of the nut and resiliently engage the surface on which the washer is resting and to also engage one of the bottom edges of the nut so that as the nut is tightened the washer is biased laterally to grip the bolt to prevent it from turning, the projection being shaped so that it grips the surface beneath the washer with a biting and wedging action as the nut tends to loosen.

5. A nut lock comprising a washer having a single integral projection arranged to contact one of the faces of the nut so as to turn with it and enable the projection to be gripped by a wrench, said projection being shaped so that it normally resiliently grips the surface on which the washer is resting and when the nut tends to turn in a direction to loosen it the projection bites into the surface at a sharper angle.

6. A nut lock comprising a washer having a single integral projection arranged to contact one of the faces of the nut so as to turn with it and enable the projection to be grasped by a wrench, said projection being shaped so that it normally resiliently grips the surface on which the washer is resting and when the nut tends to loosen bites into the surface at a sharper angle and when an abnormal loosening force is applied to the nut engages the main body of the washer.

7. A nut lock comprising a washer having an integral substantially U-shaped projection struck up therefrom, the free end of the projection being provided with a biting edge which normally lies below the bottom surface of the washer and which resiliently engages the surface on which the washer is resting when the washer is placed in position, said projection being formed so as to contact one of the faces of the nut, whereby as the nut tends to loosen the gripping edge is caused to bite into the surface beneath the washer at a sharper angle and grip the surface harder the more the nut tends to loosen.

8. A nut lock comprising a washer having a projection struck up therefrom near its periphery and arranged to engage one of the flat faces of a nut so as to turn therewith and be in a position to be grasped by a wrench, said projection having a resilient downwardly extending tongue provided with a biting edge normally projecting below the bottom surface of the washer whereby when the washer is placed in position beneath the nut the biting edge is biased into gripping engagement with the surface on which the washer is resting, said tongue and biting edge being positioned so that as the nut tends to loosen the edge bites into the surface at a sharper angle with a wedging action.

9. A nut lock comprising a washer having a projection struck up therefrom near its periphery and arranged to engage one of the flat faces of a nut so as to turn therewith and be in a position to be grasped by a wrench, said projection having a resilient downwardly extending tongue provided with a biting edge normally projecting below the bottom surface of the washer, whereby when the washer is placed in position beneath the nut the biting edge is biased into gripping engagement with the surface on which the washer is resting, said tongue and biting edge being positioned so that as the nut tends to loosen the edge bites into the surface at a sharper angle with a wedging action, the tongue being also provided with a heel arranged to engage the body of the washer when the tongue is moved under abnormal loosening forces.

10. A nut lock comprising a washer having a projection struck up therefrom near its periphery and arranged to engage one of the flat faces of a nut so as to turn therewith and be in a position to be grasped by a wrench, said projection being struck up on a radius forming a curved surface which is located at such a distance from the center as to cause the washer to be biased laterally to grip the body of the bolt when the nut or bolt head engages the curved surface, said projection having a resilient downwardly extending tongue provided with a biting edge normally projecting below the bottom surface of the washer whereby when the washer is placed in position beneath the nut the biting edge is biased into gripping engagement with the surface on which the washer is resting, said tongue and biting edge being positioned so that as the nut tends to loosen the edge bites into the surface at a sharper angle with a wedging action.

In testimony whereof, I have hereunto set my hand.

AUREL HANSCHILD.

Witnesses:
GLENN H. LERESCHE,
C. B. SANDERSON.